No. 722,001. PATENTED MAR. 3, 1903.
J. M. DODGE.
DETACHABLE LINK DRIVE CHAIN.
APPLICATION FILED DEC. 4, 1902.

NO MODEL.

Witnesses:
Frank L. A. Graham
Herman E. Metius

Inventor:
James M. Dodge,
by his Attorneys
Howson & Howson

UNITED STATES PATENT OFFICE.

JAMES M. DODGE, OF PHILADELPHIA, PENNSYLVANIA, ASSIGNOR TO THE LINK BELT ENGINEERING COMPANY, OF PHILADELPHIA, PENNSYLVANIA, A CORPORATION OF PENNSYLVANIA.

DETACHABLE-LINK DRIVE-CHAIN.

SPECIFICATION forming part of Letters Patent No. 722,001, dated March 3, 1903.

Application filed December 4, 1902. Serial No. 133,903. (No model.)

*To all whom it may concern:*

Be it known that I, JAMES M. DODGE, a citizen of the United States, residing in Philadelphia, Pennsylvania, have invented certain Improvements in Detachable-Link Drive-Chains, of which the following is a specification.

My invention relates to certain improvements in drive-chains and what are commonly known as "silent" chains—that is, chains in which the links have lugs which bear against the faces of the teeth of the sprocket-wheels around which the chain passes. This type of chain has heretofore been made solely of plate-links which are struck up out of thin metal and placed side by side in series to make the chain of the proper width. The links are coupled together by pivot-pins and are therefore not readily detachable.

The object of my invention is to make a detachable chain-link of this type, and this object I attain in the following manner, reference being had to the accompanying drawings, in which—

Figure 1:
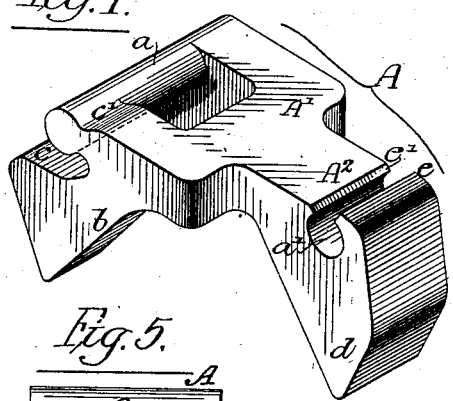
Figure 4:
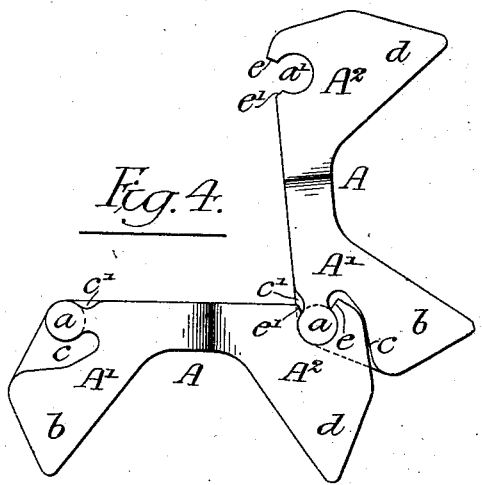
Figure 5:
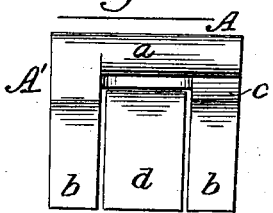
Figure 2:
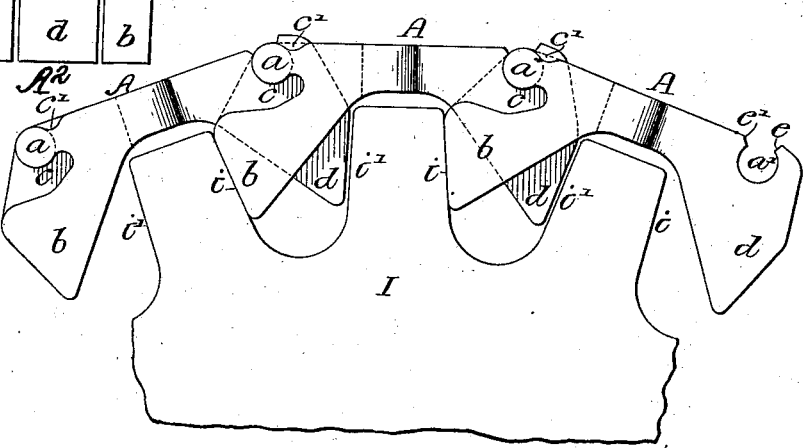
Figure 3:
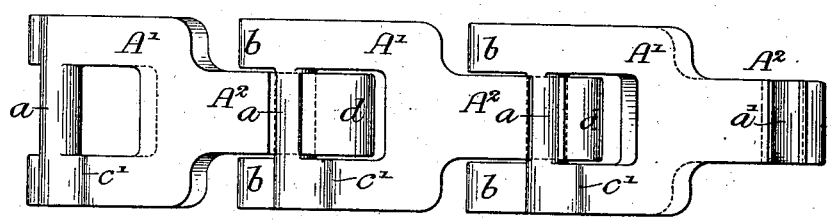

Figure 1 is a perspective view of one of the links of my improved silent drive-chain. Fig. 2 is a side view showing a series of the links coupled together and in position on a portion of a sprocket-wheel. Fig. 3 is a plan view. Fig. 4 is a view showing one link turned up ready to be disconnected from an adjoining link, and Fig. 5 is an end view of one of the links.

A is one of the links of the chain. Each link is made as clearly shown in Fig. 1, having a wide portion $A'$ and a narrow portion $A^2$. The wide portion $A'$ is forked, and extending from one side to the other is a pivot-bar $a$, and in the portion $A^2$ is a socket $a'$. This socket is open at the top and extends from side to side of the portion $A^2$. On the wide portion $A'$ are two tapered teeth or lugs $b\ b$, and on the narrow portion $A^2$ is a single tooth or lug $d$.

One side of the wide portion $A'$, between the pivot-pin and the tooth $b$, is recessed at $c$ and is preferably notched at $c'$ for the purpose of allowing the edges $e\ e'$ of the socket $a'$ to pass when one link is being coupled to another.

As shown in the drawings, the tooth $d$ of one link passes between the teeth $b$ of an adjoining link when the two links are coupled together. The appearance of the chain when the links are coupled is shown clearly in Fig. 2.

The bearing-faces of the teeth $b$ aline with the bearing-faces $i$ of the teeth of the sprocket-wheel I, and the bearing-faces of the teeth $d$ aline with the bearing-faces $i'$ of the teeth of the sprocket-wheel according to the direction of drive, so that there is an extended bearing of each tooth of the chain against the teeth of the sprocket-wheel, and owing to the peculiar form of tooth all lost motion is taken up immediately, so that there is very little noise, if any, when the chain is in motion, making what is termed a "silent" drive-chain.

In order to detach one link from another, all that is necessary is to turn one of the links up to the position shown in Fig. 4 until the portion $e$ of one link enters the recess $c$ of an adjoining link, when it can be removed laterally and detached. The links can be coupled together in the same manner.

The link shown in the drawings is what may be termed a "bridge-link"—that is, a link that bridges over the teeth of the sprocket-wheel, the body of the link not touching the sprocket-wheel, the projecting teeth of the chain simply engaging the wheel.

I claim as my invention—

1. A drive-chain link having projecting teeth and having at one end a bar and at the other end a socket, and so arranged that the bar of one link will enter the socket of an adjoining link, substantially as described.

2. A chain-link having a wide and a narrow portion, two projecting teeth on the wide portion, and a single projecting tooth on the narrow portion, a bar extending across the wide portion, and a socket in the narrow portion, the bar of one link being arranged to rest in the socket of an adjoining link, substantially as described.

3. A chain-link having a wide and a narrow portion, two teeth on the wide portion, and a single tooth on the narrow portion, a socket on the narrow portion open at the top, a bar extending across the wide portion, one side member of the wide portion being recessed to allow for the lateral placing or removal of an adjoining link, substantially as described.

4. A drive-chain made up of a series of links having projecting teeth, each link having a bar at one end and a socket at the opposite end, and each link having one side member recessed between the tooth and the bar, so that the links can be detached one from another by turning them up and moving them laterally, substantially as described.

In testimony whereof I have signed my name to this specification in the presence of two subscribing witnesses.

JAMES M. DODGE.

Witnesses:
  WILL. A. BARR,
  JOS. H. KLEIN.